(12) United States Patent
Van Doremaele et al.

(10) Patent No.: US 8,987,393 B2
(45) Date of Patent: Mar. 24, 2015

(54) CATALYST COMPONENT FOR THE POLYMERIZATION OF OLEFINS HAVING A GUANIDINATE LIGAND

(75) Inventors: Gerardus Henricus Josephus Van Doremaele, HN Sittard (NL); Martin Alexander Zuideveld, Kelmis (BE); Victor Fidel Quiroga Norambuena, Lanaken (BE); Alexandra LeBlanc, Neerharen (BE)

(73) Assignee: LANXESS Elastomers B.V., Geleen (NL)

( * ) Notice: Subject to any disclaimer, the term of this patent is extended or adjusted under 35 U.S.C. 154(b) by 246 days.

(21) Appl. No.: 13/505,162

(22) PCT Filed: Nov. 5, 2010

(86) PCT No.: PCT/EP2010/066905
§ 371 (c)(1),
(2), (4) Date: Dec. 14, 2012

(87) PCT Pub. No.: WO2011/054927
PCT Pub. Date: May 12, 2011

(65) Prior Publication Data
US 2013/0079478 A1  Mar. 28, 2013

(30) Foreign Application Priority Data
Nov. 6, 2009 (EP) .................................. 09175241

(51) Int. Cl.
| | | |
|---|---|---|
| C08F 4/642 | (2006.01) | |
| C08F 4/643 | (2006.01) | |
| C08F 4/6592 | (2006.01) | |
| C08F 10/00 | (2006.01) | |
| C08F 210/16 | (2006.01) | |
| C08F 4/76 | (2006.01) | |
| C08F 4/6392 | (2006.01) | |
| C08F 4/74 | (2006.01) | |
| C08F 210/06 | (2006.01) | |
| C08F 210/14 | (2006.01) | |
| C08F 236/20 | (2006.01) | |
| C08F 4/659 | (2006.01) | |

(52) U.S. Cl.
CPC . C08F 4/76 (2013.01); C08F 10/00 (2013.01); C08F 4/6392 (2013.01); C08F 4/6592 (2013.01); C08F 4/74 (2013.01); C08F 210/06 (2013.01); C08F 210/14 (2013.01); C08F 236/20 (2013.01); C08F 4/65908 (2013.01); C08F 4/65912 (2013.01); C08F 2420/03 (2013.01); Y10S 526/943 (2013.01)
USPC ........... 526/161; 526/129; 526/133; 526/134; 526/160; 526/165; 526/348; 526/348.2; 526/943; 502/103; 502/120; 502/152; 502/167

(58) Field of Classification Search
CPC ............. C08F 4/65908; C08F 4/65912; C08F 4/65916; C08F 4/6592; C08F 10/00; C08F 210/16

USPC .......... 502/103, 152, 167, 120; 526/129, 133, 526/134, 160, 161, 165, 348, 348.2, 943
See application file for complete search history.

(56) References Cited

U.S. PATENT DOCUMENTS

| | | |
|---|---|---|
| 6,114,481 A | 9/2000 | McMeeking et al. |
| 6,175,409 B1 | 1/2001 | Nielsen et al. |
| 6,260,407 B1 | 7/2001 | Petro et al. |
| 6,265,226 B1 | 7/2001 | Petro et al. |
| 6,294,388 B1 | 9/2001 | Petro |
| 6,296,771 B1 | 10/2001 | Miroslav |
| 6,306,658 B1 | 10/2001 | Turner et al. |
| 6,420,300 B1 | 7/2002 | McMeeking et al. |
| 6,858,558 B2 | 2/2005 | Kretschmer |
| 7,956,140 B2 | 6/2011 | Ijpeij et al. |

FOREIGN PATENT DOCUMENTS

WO     02070669 A    9/2002

OTHER PUBLICATIONS

Rodriguez, G. "Triazamethylenemethane Complexes of Zirconium and Tantalum", 1998, Journal of Molecular Catalysis A: Chemical 128, pp. 5-28.
Potts, S, "Synthesis of Zirconium Guanidinate Complexes and the Formation of Zirconium Carbonitride via Low Pressure CVD", Feb. 17, 2009, Organometallics, pp. 1838-1844.
Kretschmer, W. "A Highly Efficient Titanium-based Olefin Polymerisation Catalyst wiht a Monoanionic Imminoimidazolidide Donor Ancillary Ligand", CHEM Commun, 2002, pp. 608-609.
Boussie, T., "A Fully Integrated High-Throughput Screening Methodology for the Discovery of New Polyolefin Catalysts: Discovery of a New Class of High Temperature Single-Site Group (IV) Copolymerization Catalysts", J.AM. Chem Soc. 2003, 125, 4306-4317.
Mena, M. Preparation of Titanium Pentamethylcyclopentadienyl Trialkyls and Crystal Structure of Tribenzylpentamethylcyclopentadienyltitanium, Showing Some Evidence of a CH . . . Ti Interaction.

(Continued)

*Primary Examiner* — Caixia Lu
(74) *Attorney, Agent, or Firm* — Jennifer R. Seng

(57) ABSTRACT

The invention relates to a new catalyst component for the polymerization of olefins comprising a compound of formula $CyLMZ_p$, wherein M is a Group 4-6 metal, Z is an anionic ligand, p is the number of anionic ligands, Cy is a mono- or poly-substituted cyclopentadienyl-type ligand and L is a guanidinate ligand of the formula wherein: each A is independently selected from nitrogen or phosphorus and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals. The invention also relates to a catalyst system for the polymerization of olefins and a process for the polymerization of at least one olefin having 2 to 20 carbon atoms.

17 Claims, No Drawings

(56) References Cited

OTHER PUBLICATIONS

Mena, M. "Electron Deficient (Pentamethylcyclopentadienyl) Titanium Trialkyls: Evidence of Ti H C and Ti . . . C - C Interactions Crystal and Molecular Structure", Organometallics, 1989 8, 476-482.

International Search Report from co-pending Application EP2010066905 dated Mar. 18, 2011, 3 pages.

Stephan et al., "An Approach to Catalyst Design: Cyclopentadienyl-Titanium Phosphinimide Complexes in Ethylene Polymerization", Organometallics 2003, 22, American Chemical Society pp. 1937-1947.

CATALYST COMPONENT FOR THE POLYMERIZATION OF OLEFINS HAVING A GUANIDINATE LIGAND

The invention relates to a new catalyst component for the polymerization of olefins of formula $CyLMZ_p$, wherein
M is a Group 4-6 metal,
Cy is a cyclic ligand,
L is a guanidinate ligand,
Z is an anionic ligand, and
p is the number of anionic ligands.

The invention also relates to a catalyst system for the polymerization of olefins. The invention further relates to a process for the polymerization of at least one olefin having 2 to 20 carbon atoms and relates to a polymer obtained by the process of the invention.

Such catalyst system is known from U.S. Pat. No. 6,420,300. This patent relates to a catalyst system for olefin polymerization comprising a catalyst which is an organometallic complex of a Group 4 metal and an activator, the organometallic complex containing a ketimide ligand.

A disadvantage of the process described in U.S. Pat. No. 6,420,300 is that an organometallic complex containing a guanidinate-type ligand forms an inefficient olefin polymerization catalyst system.

A purpose of the invention is to provide a new class of catalyst components comprising guanidinate-type ligands providing highly active catalyst systems for the polymerization of olefins.

This objective is reached by a catalyst component comprising a compound of formula $CyLMZ_p$ wherein
Cy is a mono- or polysubstituted cyclopentadienyl-type ligand and
L is a guanidinate ligand of the formula

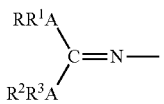

wherein each A is independently selected from nitrogen or phosphorous and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals.

Surprisingly with the catalyst component according to the invention, highly active catalyst systems for the polymerization of olefins are obtained. Another advantage of the catalyst component according to the present invention is that the ligands L are commercially available or can be prepared by simple synthetic processes. A further advantage of the catalyst component according to the invention is the good solubility in hydrocarbon solvents.

An embodiment of the cited prior art document U.S. Pat. No. 6,420,300 teaches a Group 4 metal complex containing ketimide ligands further containing cyclopentadienyl-type ligands (claim 4). Both cyclopentadienyl (Cp) and pentamethylcyclopentadienyl (Cp*) ligands are reported in the examples (Examples 1-11). Replacing Cp by Cp* in the catalyst system of U.S. Pat. No. 6,420,300 shows hardly any increase of catalyst activity in the copolymerization process.

Further, the cited prior art document demonstrates the high ethylene polymerization activity of the bis-tert-butylketimide ligand ($^tBu_2C$=N—) containing catalyst system for both the cyclopentadienyl as well as pentamethylcyclopentadienyl versions (Examples 19 and 20 respectively). In contrast Example 21 shows that replacing ($^tBu_2C$=N—) by tetramethylguanidinate (($Me_2N$—$)_2C$=N—) results in a polymerization activity that is reduced by not less than a factor 6.

In consequence U.S. Pat. No. 6,420,300 teaches away from guanidinate type ligands and a preferred embodiment is a Group 4 metal complex containing the combination of bis-tert-butylketimide and cyclopentadienyl ligand.

The more surprisingly is that starting from the low active guanidinate containing catalyst system from Example 21 in U.S. Pat. No. 6,420,300 and replacing Cp by Cp* results in an increase of the olefin polymerization activity by 3000% as is demonstrated by Comparative Experiment C and Example 2.

WO02/070569 describes a catalyst component, a catalyst system and a process for the preparation of high molecular weight ethylene or α-olefin homopolymers, ethylene-α-olefin copolymers, terpolymers or tetrapolymers, in a polymerization process, at elevated temperature, preferably at least 80° C. WO02/070569 describes a catalyst component of formula $CyLMZ_p$ comprising a Group 4 to 6 metal, a cyclopentadienyl-type ligand, and a monohapto bonded N=Y-type ligand L wherein L is a 1,3-diaza-2-imino heterocyclic ligand.

A disadvantage of the catalyst system claimed in WO02/070669 is that the synthesis of the 1,3-diaza-2-imino ligands requires the use of the highly toxic component cyanogen bromide. A further disadvantage is the poor solubility in hydrocarbon solvents of these catalyst systems.

Further advantages of the catalyst system according to the present invention are its good tolerance to scavenger present during the polymerization process as well as the high polymerization activity at temperatures above 80° C. In the field of olefin polymerization it is well known that higher polymerization temperatures are advantageous e.g. in view of process technology.

WO02/070569 discourages from using guanidinate containing catalyst components (ref. Component A in the cited document) by demonstrating the negative effect of scavenger on catalytic activity (Table 3 in WO02/070669) and the inactivity in olefin polymerization of the guanidinate containing catalyst system at temperatures above 80° C. (Table 1 and 5 in WO02/070669).

Own experiments (Comparative Experiments E and F in the present application) have shown that the pentamethylsubstitution of the cyclopentadienyl ligand of the 1,3-diaza-2-imino heterocyclic ligand comprising catalyst component disclosed in WO02/070569, does not result in a catalyst system with a higher polymerization activity.

A publication by Kretschmer et al. in Chemical Communications, 2002, p. 608 describes a titanium based olefin polymerization catalyst with iminoimidazolidinide π-donor ligands. While this publication does not disclose the use of substituted cyclopentadienyl ligands it further discourages the use of guanidinate-type ligands because of their low olefin polymerization activity.

DETAILS OF THE INVENTION

The invention relates to a catalyst component for the polymerization of olefins of formula $CyLMZ_p$, wherein
M is a Group 4 to 6 metal,
Z is an anionic ligand,
p is the number of anionic ligands, and
Cy is a mono- or polysubstituted cyclopentadienyl-type ligand, L is a guanidinate ligand of the formula

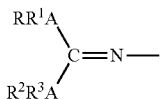

wherein each A is independently selected from nitrogen or phosphorus and R, $R^1$, $R^2$ and $R^3$ are independently selected from the group consisting of hydrogen, hydrocarbyl, silyl and germyl residues, substituted or not with one or more halogen, amido, phosphido, alkoxy, or aryloxy radicals.

The common characteristic of guanidinate and ketimide ligands is that they contain a mono substituted nitrogen atom in the sense that only one carbon atom is (doubly) bonded to the nitrogen atom (C=N). A specific characteristic of guanidinate ligands is that this double bounded carbon atom is connected to two substituents via Group 15 atoms represented by A in the formula above.

The substituents of the guanidinate ligand L, "$RR^1A$" and "$R^2R^3A$" may be the same or different without being part of a mutual ring structure.

A preferred embodiment of the invention consist of the catalyst component comprising a compound of formula $CyLMZ_p$ wherein L is $(RR^1N)(R^2R^3N)C=N-$ and R, $R^1$, $R^2$ and $R^3$ are independently selected from the group consisting of hydrogen and hydrocarbyl residue.

The mono- or polysubstituted cyclopentadienyl-type ligand Cy is substituted with radicals selected from the group consisting of halogen, hydrocarbyl, silyl and germyl residues, optionally substituted with one or more halogen, amido, phosphido, alkoxy, or aryloxy radicals.

As used herein, the term substituted cyclopentadienyl-type ligand is meant to broadly convey its conventional meaning, namely a substituted ligand having a five-membered carbon ring which is bonded to the metal via a π-type bonding. Thus, the term cyclopentadienyl-type includes cyclopentadienyl, indenyl and fluorenyl. The term mono- or polysubstituted refers to the fact that one or more aromatic hydrogen atoms of the cyclopentadienyl structure have been replaced by one or more other residues. The number of substituents is between 1 and 5 for the cyclopentadienyl ligand, 1 to 7 for the indenyl ligand and 1 to 9 for the fluorenyl ligand. An exemplary list of substituents for a cyclopentadienyl ligand includes the group consisting of $C_{1-10}$ hydrocarbyl radical (which hydrocarbyl substituents are unsubstituted or further substituted), a halogen atom, $C_{1-8}$ alkoxy radical, $C_{6-10}$ aryl or aryloxy radical; an amido radical which is unsubstituted or substituted by up to two $C_{1-8}$ alkyl radicals, a phosphido radical which is unsubstituted or substituted by up to two $C_{1-8}$ alkyl radicals, silyl radicals of the formula $-Si-(R^4)_3$ wherein each $R^4$ is selected from the group consisting of hydrogen, $C_{1-8}$ alkyl or alkoxy radical, $C_{6-10}$ aryl or aryloxy radicals and germanyl radicals of the formula $-Ge-(R^5)_3$ wherein each $R^5$ is selected from the group consisting of hydrogen, $C_{1-8}$ alkyl or alkoxy radical, $C_{6-10}$ aryl or aryloxy radical.

In a preferred embodiment, the cyclopentadienyl ligand is penta substituted by methyl groups and in consequence Cy is the is 1,2,3,4,5-pentamethylcyclopentadienyl, $C_5Me_5$, commonly referred to as Cp*.

An optional characteristic of the ligands Cy and L is that one or more of the substituents of Cy can be selected in a way to bear the chemical structure of the guanidinate ligand L and in consequence represent a combination of the two ligands Cy and L in a single chemical structure. Such structure can easily be represented by the formula Cy-L and is commonly referred to as bridged ligand structure.

The catalyst component of the invention comprises anionic ligands which in some cases can be referred to as "activatable ligand". This understands that the ligand may be removed by one or more activating compounds such as aluminoxane, borate and borane to facilitate olefin polymerization. Exemplary activatable ligands are independently selected from the group consisting of a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted or further substituted by a halogen atom, a $C_{1-8}$ alkyl radical, a $C_{1-8}$ alkoxy radical, a $C_{6-10}$ aryl or aryloxy radical, a silicium radical, an amido radical which is unsubstituted or substituted by up to two $C_{1-8}$ alkyl radicals; a phosphido radical which is unsubstituted or substituted by up to two $C_{1-8}$ alkyl radicals.

In a preferred embodiment of the invention the anionic ligand Z is selected from the group consisting of $C_{1-10}$ hydrocarbyl radicals, most preferably the anionic ligand Z is a methyl radical.

If the catalyst component contains two or more anionic ligand, these ligands can be identical or different while equal anionic ligands are preferred in view of reduced synthetic complexity.

The number of anionic ligands depends on the valency of the metal and the valency of the anionic ligand. Whereas the valency of the Group 5 and 6 metals can be as high as 6+, the preferred catalyst metals are Group 4 metals in their highest oxidation state (i.e. 4+) and the preferred anionic ligands are monoanionic (such as a halogen or a hydrocarbyl group—especially methyl and benzyl—). Thus, the preferred catalyst component contains a guanidinate ligand, a substituted cyclopentadienyl ligand and two chloride (or methyl) ligands bonded to the Group 4 metal. In contrast, the highest oxidation state of Group 5 and 6 metals are 5+ and 6+ respectively and will require a higher number or a higher anionic ligand valency to fulfill the electronic requirements. In some instances, the metal of the catalyst component may not be in the highest oxidation state. For example, a titanium (III) component would contain only one anionic ligand.

The most preferred catalyst for use in the process according to the invention is a Group 4 organometallic complex in its highest oxidation state having a guanidinate ligand, a substituted cyclopentadienyl-type ligand and two anionic ligands. These requirements may be concisely described using the following formula for the preferred catalyst $CyLMZ_p$, wherein: M is a metal selected from Ti, Hf and Zr; L is a guanidinate ligand, Cy is a ligand selected from the group consisting of substituted cyclopentadienyl, substituted indenyl, substituted fluorenyl; Z is an anionic ligand and p is the number of anionic ligands.

A further embodiment of the invention consists of a catalyst system for the polymerization of olefins comprising the described catalyst component according to the present invention in the presence of one or more ingredients selected from the group consisting of activator, scavenger and carrier.

The activator may be selected from the group consisting of:
(i) an aluminoxane and
(ii) an activator capable of ionizing the Group 4 to 6 metal complex.

Aluminoxanes may be used as activator and/or as a catalyst poison scavenger and/or as an alkylating agent. Most often the aluminoxane is a mixture of different organoaluminum compounds.

The aluminoxane may be of the overall formula: $(R^6)_2AlO(R^6AlO)_mAl(R^6)_2$ wherein each $R^6$ is independently selected from the group consisting of $C_{1-20}$ hydrocarbyl radicals and m is from 0 to 50, preferably $R^6$ is a $C_{1-4}$ radical and m is from 5 to 30. Methylaluminoxane (MAO) in which most of the $R^6$ groups in the compounds of the mixture are methyl is the preferred aluminoxane.

Aluminoxanes are readily available articles of commerce generally as a solution in a hydrocarbon solvent.

The aluminoxane, when employed, is preferably added at an aluminum to transition metal (in the catalyst) mole ratio of from 10:1 to 5000:1. Preferred ratios are from 20:1 to 1000:1. Most preferred ratios are from 50:1 to 250:1.

The activator capable of ionizing the Group 4 to 6 metal complex may be selected from the group consisting of:
(i) borate compounds of the formula $[R^7]^+[B(R^8)_4]^-$ wherein B is a boron atom, $R^7$ is a cyclic $C_{5-7}$ aromatic cation or a triphenyl methyl cation and each $R^8$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $—Si—(R^{10})_3$; wherein each $R^{10}$ is independently selected from the group consisting of a hydrogen atom and a $C_{1-4}$ alkyl radical; and
(ii) borate compounds of the formula $[(R^9)_tA'H]^+[B(R^8)_4]^-$ wherein B is a boron atom, H is a hydrogen atom, A' is a nitrogen atom or phosphorus atom, t is 2 or 3 and $R^9$ is selected from the group consisting of $C_{1-8}$ alkyl radicals, a phenyl radical which is unsubstituted or substituted by up to three $C_{1-4}$ alkyl radicals, or one $R^9$ taken together with the nitrogen atom may form an anilinium radical and $R^8$ is as defined above; and
(iii) borane compounds of the formula $B(R^8)_3$ wherein $R^8$ is as defined above.

Readily commercially available activators which are capable of ionizing the Group 4 to 6 metal complexes include: N,N-dimethylanilium-tetrakispentafluorophenyl borate, triphenylmethylium tetrakispentafluorophenyl borate, and trispentafluorophenyl boron.

The term scavenger as used in this specification is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when an activator capable of ionizing the Group 4 to 6 metal complex is also present. Aluminum alkyls and aluminoxanes are suitable scavengers. Typical examples are triethylaluminum ($Et_3Al$), trioctylaluminum ($Oct_3Al$), tri-isobutylaluminum (i-$Bu_3Al$), $(Et_2Al)_2O$, $(Oct_2Al)_2O$, (i-$Bu_2Al)_2O$ and oligomers thereof such as $[(Et_2Al)_2O]_n$ $[(Oct_2Al)_2O]_n$ and $[(i-Bu_2Al)_2O]_n$ (with n>1).

An exemplary list of carriers (also called carrier materials or support materials) includes metal oxides (such as silica, alumina, silica-alumina, titania and zirconia); metal chlorides (such as magnesium chloride); polymers or talc.

The preferred support material is silica. In a particularly preferred embodiment, the silica has been treated with an aluminoxane (especially methylaluminoxane or MAO) prior to the deposition of the Group 4 metal complex. It will be recognized by those skilled in the art that silica may be characterized by such parameters as particle size, pore volume and residual silanol concentration. The pore size and silanol concentration may be altered by heat treatment or calcination.

The residual silanol groups provide a potential reaction site between the aluminoxane and the silica. This reaction may help to "anchor" the aluminoxane to the silica.

As a general guideline, the use of commercially available silicas, such as those sold by W.R. Grace under the trademark Davidson 948 or Davidson 955, are suitable.

A preferred embodiment of the invention consists of a catalyst system wherein the activator is selected from the group consisting of borate, borane and alkylaluminoxane.

The invention further relates to a process for the polymerization of at least one olefin having 2 to 20 carbon atoms in the presence of a catalyst component according to the invention.

Polymerizations according to this invention may be undertaken in any of the well know olefin polymerization processes including those known as "gas phase", "slurry", "high pressure" and "solution".

The use of a supported catalyst is preferred for gas phase and slurry processes whereas a non-supported catalyst is preferred for the solution process.

The polymerization process according to this invention uses an olefin, e.g. ethylene or propylene and may include other monomers which are copolymerizable therewith (such as other olefins, preferably propylene, butene, hexene or octene, and optionally dienes such as hexadiene isomers, vinyl aromatic monomers such as styrene or cyclic olefin monomers such as norbornene).

The polyethylene polymers which may be prepared in accordance with the present invention typically comprise not less than 60, preferably not less than 70 wt % of ethylene and the balance one or more $C_{4-10}$ alpha olefins preferably selected from the group consisting of 1-butene, 1-hexene and 1-octene. The polyethylene prepared in accordance with the present invention may be linear low density polyethylene having density from about 0.910 to 0.935 g/mL. The process of the present invention is preferably used to prepare polyethylene having a density below 0.910 g/mL—the so called very low and ultra low density polyethylenes.

The process of the present invention may also be used to prepare elastomeric co- and terpolymers of ethylene, propylene and optionally one or more diolefin monomer (diene). Generally, such elastomeric polymers will contain about 40 to about 80 wt % ethylene, preferably about 50 to 75 wt % ethylene and correspondingly from 60 to 20 wt % and preferably from 50 to 25 wt % of propylene respectively. A portion of the monomers, typically the propylene monomer, may be replaced by a non-conjugated diolefin. The diolefin may be present in amounts up to 10 wt % of the polymer although typically is present in amounts from about 3 to 5 wt %. The resulting polymer may have a composition comprising from 40 to 80 wt % of ethylene, from 60 to 20 wt % of propylene and up to 10 wt % of a diene monomer to provide 100 wt % of the polymer. Preferred but not limiting examples of the dienes are dicyclopentadiene (DCPD), 1,4-hexadiene (HD), 5-methylene-2-norbornene, 5-ethylidene-2-norbornene (ENB) and 5-vinyl-2-norbornene (VNB). Particularly preferred dienes are ENB and VNB.

The polymers prepared according to the process of the present invention may have a weight average molecular weight of 10,000 to 5,000,000 g/mol. Preferably, the polymers have a weight average molecular weight of 20,000 to 1,000,000 g/mol, more preferably 50,000 to 300,000 g/mol.

The preferred polymerization process of this invention encompasses the use of the novel catalysts system in a medium pressure solution process. As used herein, the term "medium pressure solution process" refers to a polymerization carried out in a solvent for the polymer at an operating temperature from 20 to 150° C. (especially from 40 to 120°

C.) and a total pressure of from 3 to 35 bar. Hydrogen may be used in this process to control molecular weight. Optimal catalyst component concentrations are affected by such variables as temperature and monomer concentration but may be quickly optimized by non-inventive tests.

The most preferred process of the present invention is a solution process for the polymerization of ethylene propylene diene elastomers (EPDM). These processes are conducted in the presence of an inert hydrocarbon solvent such as a $C_{5-12}$ hydrocarbon which may be unsubstituted or substituted by a $C_{1-4}$ alkyl group such as pentane, methyl pentane, hexane, heptane, octane, cyclohexane, methylcyclohexane and hydrogenated naphtha.

The monomers used in the process according to the invention for the preparation of the polymer may be dissolved/dispersed in the solvent prior to being fed to a reactor. For a gaseous monomer, the monomer may be fed to a reactor so that it will dissolve in the reaction mixture. Prior to mixing, the solvent and monomers are preferably purified to remove potential catalyst poisons such as water or oxygen. The feedstock purification follows standard practices in the art, e.g. molecular sieves, alumina beds and oxygen removal catalysts are used for the purification of monomers. The solvent itself (e.g. methylpentane, cyclohexane, hexane or toluene) is preferably treated in a similar manner.

The feedstock may be heated or cooled prior to feeding to the polymerization reactor. Additional monomers and solvent may be added to a second reactor and the reactor(s) may be heated or cooled.

Generally, the catalyst component and ingredients such as scavenger and activator can be added as separate solutions to the reactor or premixed before adding to the reactor.

The residence time in the polymerization reactor will depend on the design and the capacity of the reactor. Generally the reactors should be operated under conditions to achieve a thorough mixing of the reactants. If two reactors in series are used, it is preferred that from 50 to 95 wt % of the final polymer is polymerized in the first reactor, with the balance being polymerized in the second reactor. It is also possible to use a dual parallel reactor setup. On leaving the reactor the solvent is removed and the resulting polymer is finished in a conventional manner.

It is also within the scope of this invention to use more than two polymerization reactors.

The invention also relates to the polymer obtainable by the process according to the invention.

An advantage of the process according to the invention is that the process employing the monomeric units of ethylene, propylene, ethylidene norbornene and vinylidene norbornene shows a high relative copolymerization rate for vinylidene norbornene and ethylidene norbornene compared to ethylene. This results in improved diene monomer utilization during the polymerization process whilst providing EPDM polymers with increased level of incorporated ethylidene and/or vinylidene norbornene. Especially the high incorporation level of vinylidene norbornene is an unexpected feature of the described catalyst system.

Due to the high fraction of vinylidene norbornene non-conjugated diolefin that is polymerized with only one of the double bonds, the polymer comprises a lot of double bonds originating from the vinylidene norbornene available for curing. It is known that the double bonds originating from the vinylidene norbornene give a high curing speed; especially if a peroxide based curing system is used.

For these reasons, it is very desirable to use the polymer made with the process of the present invention for the production in peroxide curing processes, preferably for the production of hoses, cable and wire covering, profiles and thermoplastic vulcanizates.

Below, the invention will be elucidated on the basis of the following examples and comparative experiments, without being limited thereto.

General Considerations

All experiments were carried out under nitrogen using Schlenk line techniques. Diethyl ether and hexane were dried by distillation from sodium potassium alloy using benzophenone ketyl as indicator. Toluene was dried by distillation from sodium using benzophenone ketyl as indicator. All other reagents were used as received without purification.

For further reference, the general procedure for screening in situ prepared catalysts in a parallel pressure reactor is described in a scientific publication on high-throughput experimentation by T. R. Boussie et al., *Journal of the American Chemical Society*, 2003, 125, 4306.

A Parallel Pressure Reactor (48-PPR) used in the experiments is fully described in U.S. Pat. No. 6,306,658. High-temperature Size Exclusion Chromatography was performed using an automated Rapid GPC system as described, for example in U.S. Pat. Nos. 6,175,409; 6,294,388; 6,260,407; 6,296,771; and 6,265,226. All of the molecular weight data were measured relative to linear polystyrene standards. Rapid FT-IR was performed on a Bruker Equinox 55+IR Scope II in reflection mode to determine the level of 1-octene incorporated in the copolymer. Samples were prepared in a thin film format by evaporative deposition techniques. 1-octene content was obtained from ratio of peak heights at 1378 and 4335 $cm^{-1}$. This method was calibrated using a set of ethylene-1-octene copolymers with a range of known 1-octene content.

Copolymerizations with a selected number of in situ generated catalyst systems were conducted in a 48-cell parallel polymerization reactor (48-PPR) as follows:

Preparation of the 48-Cell Polymerization Reactor Prior to the Injection of Catalyst Composition:

A pre-weighed glass vial insert (ca. 12 ml total volume) and a disposable stirring paddle were fitted to each reactor vessel of the 48-cell Symyx PPR® in an inert atmosphere dry box. The reactor was then closed and flushed with ethylene gas (4.2 bar). After ethylene was released, each reactor vessel was under atmospheric ethylene pressure. 0.15 mL of 1-octene, 0.10 mL of freshly prepared mixture solution of MMAO-3A (modified methylaluminoxane from AKZO Nobel) and 4-methyl-2,6-di-tert-butylphenol (BHT) (0.05 M in toluene with MMAO-3A:BHT molar ratio 1:1), and 3.85 mL toluene were injected into each reactor vessel through a valve. The toluene/1-octene mixture was exposed to ethylene gas at 5.6 bar for 30 seconds. The temperature was then set to 90° C. and the stirring speed was set to 600 rpm. After temperature was equilibrated at 90° C. for 10 minutes, toluene/1-octene mixture in reaction vessel was exposed to increased ethylene pressure of 10.5 bar and stirring speed was set to 800 rpm. The pressure, the temperature, and the stirring speed settings were maintained, using computer control, until the end of the polymerization experiment.

In Situ Preparation of Ligand-Metal Precursor Compositions:

The ligand solutions and metal precursor solutions were 4.0 mM solutions of respective ligands and metal precursors in toluene. To each 1.4 mL glass vial in an inert atmosphere dry box, was added 0.625 mL of respective ligand solution and 0.625 mL of metal precursor solution. The resultant solution (2.0 mM with ligand to metal precursor molar ratio 1:1) was heated at 80° C. for 2 hours. After that, 0.10 mL toluene was added to each glass vial to compensate solvent loss due to evaporation during heating. The solution was shaken well before use.

Injection of Catalyst Solutions into the Pressure Reactor Vessel:

0.24 mL of freshly prepared mixture solution of MMAO-3A and BHT (0.25 M in toluene with MMAO-3A to BHT molar ratio 1:1) was added to a new 1.4 mL glass vial. About 20 seconds later, 0.06 mL of ligand-metal precursor solution (2.0 mM in toluene from in situ complexation) was added to the same 1.4 mL glass vial containing MMAO-3A/BHT solution. About 30 seconds later, 0.05 mL THF20 (5.0 mM in toluene) was added to the same 1.4 mL glass vial containing MMAO-3A/BHT and in situ complexed ligand-metal precursor solutions. Another 30 seconds later, 1.0 mL toluene was added to this 1.4 mL glass vial. Then 0.08 mL of the mixture solution from this 1.4 mL vial, followed immediately by 0.82 mL of toluene, was injected into the pressurized reaction vessel.

Polymerization Reaction:

The polymerization reactions were allowed to continue for either 10 minutes or a period of time until a pre-set ethylene consumption amount is reached, whichever was shorter. During this polymerization reaction period, the temperature and pressure were maintained at their pre-set levels (10.5 bar pressure, 90° C.) by computer control. After that, the ethylene flow to the reactor vessel was stopped and compressed air (14 bar pressure) was introduced into reactor vessel for 30 seconds to quench polymerization reaction. The temperature was allowed to drop to about 70° C. and the ethylene pressure in the cell was slowly vented.

Product Workup:

The glass vial insert, containing the polymer product and solvent, was then removed from the pressure cell and removed from the inert atmosphere dry box. The volatile components were removed using a centrifuge vacuum evaporator. After most of the volatile components had evaporated, the vial contents were dried thoroughly by evaporation at elevated temperature under reduced pressure. The vial was then weighed to determine the yield of polymer product. The polymer product was then analyzed by rapid GPC and by FTIR spectroscopy to determine the ratio of 1-octene to ethylene incorporated in the polymer product.

Large scale batch copolymerizations were carried out in a 2-liter batch autoclave equipped with a two stage Intermig stirrer and baffles. The reaction temperature was set on 90° C. and regulated by a Lauda Thermostat. The feed streams (solvents and monomers) were purified by contacting with various absorption media to remove catalyst killing impurities such as water, oxygen and polar compounds. During polymerization the ethylene and propylene monomers were continuously fed (80:40 volume ratio, 500 NL/h) to the gas cap of the reactor. The pressure of the reactor was kept constant by a back-pressure valve at 8 bar.

The batch copolymerization experiments were conducted as follows: In an inert atmosphere of nitrogen, the reactor was filled with 950 ml pentamethyl heptane (PMH), MAO (Crompton, 10 wt % in toluene) and BHT (Al:BHT molar ratio of 1:1). The reactor was heated to 90° C., while stirring at 1350 rpm. The reactor was pressurized to 8 bar and conditioned under a determined ratio of ethylene and propylene for 15 minutes. Then, the catalyst components were added to the reactor (MAO:catalyst molar ratio=3000) and the catalyst vessel was rinsed with 50 mL PMH. When trityl tetrakis (perfluoro-phenyl)borate (THF20) was used, THF20 at a boron:catalyst molar ratio=1 or 2 was added directly after the catalyst was added. After 10 minutes of polymerization, the monomer flow was stopped and the solution was carefully dumped in a 2 L Erlenmeyer flask, containing a solution of Irganox-1076 in i-propanol and dried over night at 100° C. under reduced pressure.

The compounds Cp*TiBz$_3$ (c4) (M. Mena et al., *Organometallics* 1989, 8, 476), CpTiBz$_3$ (c13) (M. Mena et al., *J. Chem. Soc., Chem. Commun.* 1986, 1119), Cp*[2,6-F$_2$C$_6$H$_3$C(=N)N$^i$Pr$_2$]TiMe$_2$ (c1) (E. G. Ijpeij et al., WO 2005 090418), Cp[(Me$_2$N)$_2$C=N]TiCl$_2$ (CG2) (J. McMeeking et al., U.S. Pat. No. 6,114,481), Cp[1,3-(2,6-Me$_2$C$_6$H$_3$)$_2$C$_2$H$_4$N$_2$C=N]TiCl$_2$ (CI1) (Kretschmer et al., *Chem. Com.* 2002, 608) and Cp*[1,3-(2,6-Me$_2$C$_6$H$_3$)$_2$C$_2$H$_4$N$_2$C=N]TiCl$_2$ (CI7) (Kretschmer et al., WO02/070569 were prepared according to published methods. Tetramethylguanidine (m14) and all other chemicals were purchased and used as received.

Synthesis of CG5: Cp*[(Me$_2$N)$_2$C=N]TiCl$_2$ $^n$BuLi (6.25 mL, 10 mmol, 1.6 M in hexanes) was added to a solution of (Me$_2$N)$_2$C=NH (1.15 g, 10 mmol) in toluene (15 mL) at −78° C. The mixture was stirred and allowed to warm up to room temperature and stirred for another 30 min. This solution was then added to a solution of Cp*TiCl$_3$ (2.89 g, 10 mmol) in toluene (50 mL) at −78° C. The mixture was stirred and allowed to warm up to room temperature. The suspension was evaporated to dryness and the residue was extracted with toluene (50 mL). Subsequent filtration, in vacuo concentration and crystallization at −20° C. afforded red crystals. Yield: 1.77 g (48%). $^1$H NMR(C$_6$D$_6$, 300 MHz): δ 1.98 (s, 15 H), 1.15 (s, 18 H) ppm.

Synthesis of CG5M: Cp*[(Me$_2$N)$_2$C=N]TiMe$_2$

Methylmagnesium bromide (1.1 mL, 3.3 mmol, 3 M solution in diethyl ether) was added to a solution of CG5 (0.4 g, 1.1 mmol) in toluene (40 mL) at −78° C. The mixture was stirred, allowed to warm up to room temperature and stirred for another 30 min. Evaporation to dryness yielded and oil which was extracted with hexane. A dark yellow solid was obtained after evaporation to dryness. Yield: 0.25 g (69%). $^1$H NMR(C$_6$D$_6$, 300 MHz): δ 2.47 (s, 12 H), 1.97 (s, 15 H), 0.50 (s, 6 H) ppm. $^{13}$C NMR(C$_6$D$_6$, 75 MHz): δ 12.0, 39.9, 44.6, 119.1, 157.0 ppm.

Synthesis of m12: [(2,6-Me$_2$C$_6$H$_3$)N(Et)]$_2$C=NH

Synthesis of N-ethylidene-2,6-dimethylaniline. 2,6-Dimethylaniline (61.8 g, 0.51 mol) was added to a stirred solution of acetaldehyde (35.5 g, 0.81 mol) in tetrahydrofuran (500 mL). After stirring the reaction mixture for 1 day at room temperature, the volatiles were removed in vacuo, the residue was dissolved in THF (500 mL), acetaldehyde (35.5 g) was added to the resulting solution and the reaction mixture was allowed to react for another day at room temperature. This procedure was repeated several times until the conversion of 2,6-dimethylaniline was >98% as determined by gas chromatographic analysis. Yield: 76.7 g (102%).

Synthesis of N-ethyl-2,6-dimethylanili ne. Sodium borohydride (19.0 g, 0.5 mol) was added in small portions to a stirred solution of N-ethylidene-2,6-dimethylaniline (36.3 g, 0.247 mol) in THF (150 mL) and methanol (150 mL). The reaction was exothermic and a water/ice bath was used to cool the mixture. After addition of sodium borohydride, the bath was removed and the mixture was allowed to react for another 30 min. Then, water (150 mL) was added to the reaction mixture, while stirring and cooling the mixture with a water/ice bath. The volatiles were removed in vacuo, the aqueous layer extracted with dichloromethane (3×150 mL) and the combined organic layers were dried with sodium sulfate. Filtration and rotatory vaporation of the volatiles yielded the desired product. Yield: 36.4 g (99%).

Synthesis of N-ethyl-N-cyano-2,6-dimethylaniline. N-ethyl-2,6-dimethylaniline (5.9 g, 39.6 mmol) was added to a stirred solution of cyanogen bromide (2.1 g, 19.8 mmol) in toluene (50 mL). The reaction mixture was allowed to react overnight at room temperature during which a solid formed. A small temperature rise to 30° C. was observed. The suspension was filtered and the residue was washed with toluene (3×25 mL). The combined filtrates were evaporated to dryness by rotatory evaporation and the resulting residue was purified by Kugelrohr distillation (0.2 mbar, 110-125° C.) yielding a brown oil. Yield: 3.09 g (90%). The residue (N-ethyl-2,6-dimethylaniline hydrobromide) of the filtration step was used in the following synthetic step.

Synthesis of 1,3-bis(2,6-dimethylphenyl)-1,3-diethylguanidine. n-Butyllithium (20.5 mL, 1.6 M in hexane, 32.8 mmol) was added dropwise to a stirred suspension of N-ethyl-2,6-dimethylaniline hydrobromide (3.8 g, 16.5 mmol) in hexane (40 mL) at 0° C. The reaction mixture was stirred for 1 h at room temperature and cooled subsequently to −80° C. N-Ethyl-N-cyano-2,6-dimethylaniline (2.92 g, 16.8 mmol) was added drop wise at −80° C. after which the reaction mixture was allowed to slowly warm up to room temperature. The resulting reaction mixture was stirred for 2 h at room temperature, during which hexane (60 mL) and THF (20 mL) were added to form a homogeneous solution. The reaction mixture was quenched and washed with water (100 mL). The organic layer was separated, the aqueous layer was extracted with diethyl ether (100 mL) and the combined organic layers were dried with $Na_2SO_4$. Filtration and rotatory evaporation of the volatiles yielded the desired guanidine as a yellow waxy material. Yield: 5.3 g (99%).

Synthesis of N,N-dicyclohexylpiperidylguanidine

A solution of dicyclohexylamine (4.0 mL, 20 mmol) and triethylamine (6 mL, 43 mmol) in diethyl ether (63 mL) was added dropwise to a stirred solution of triphosgene (2.0 g, 6.7 mmol) in diethyl ether (30 mL) at room temperature. The reaction mixture was stirred overnight under refluxing conditions. Then, a solution of piperidine (1.9 mL, 19 mmol) and triethylamine (5.8 mL, 42 mmol) in diethyl ether (37 mL) was added. The reaction mixture was stirred overnight at reflux temperature. The reaction mixture was filtered and the filtrate was evaporated to dryness, yielding N,N-dicyclohexylpiperidylurea as a yellow oil. Yield: 2.0 g (35%). Oxalyl chloride (1.0 mL, 12 mmol) was added to a stirred solution of the urea (2.0 g, 6.9 mmol) in diethyl ether (30 mL). The reaction mixture was evaporated to dryness after stirring at reflux temperature for 5 h. Ammonia (3 mL, 21 mmol, 7 M solution in methanol) was added to a solution of the resulting solid in diethyl ether (50 mL) and THF (5 mL). The reaction mixture was heated to reflux overnight and evaporated to dryness. The product mixture was treated with aqueous sodium hydroxide solution. The organic layer was extracted with diethyl ether and dried over sodium sulfate. Filtration and evaporation to dryness yielded the desired guanidine as a yellow solid. Yield: 1.76 g (87%). $^1$H NMR (CDCl$_3$, 300 MHz): δ 1.18-1.89 (m 20 H), 3.03 (m, 6 H) ppm. $^{13}$C NMR (CDCl$_3$, 75 MHz): δ 25.2, 26.1, 26.2, 32.4, 49.0, 57.8, 165.2 ppm.

Synthesis of CG11: Cp[($^c$C$_6$H$_{10}$)$_2$NC(=N)NC$_5$H$_{10}$]TiCl$_2$ $^n$BuLi (4.9 mL, 7.8 mmol, 1.6 M in hexanes) was added to a solution of N,N-dicyclohexylpiperidylguanidine (2.2 g, 7.5 mmol) in THF (38 mL) at 0° C. The mixture was allowed to warm up to room temperature and stirred for another hour. This solution was then added to a solution of CpTiCl$_3$ (1.66 g, 7.6 mmol) in THF (23 mL) at −80° C. The mixture was stirred, allowed to warm up to room temperature and stirred for 1 day. The resulting suspension was evaporated to dryness and the residue was extracted with toluene. Subsequent filtration, in vacuo concentration and crystallization at low temperature from a toluene-hexane mixture afforded the desired compound as orange crystals. Yield: 3.18 g (84%). $^1$H NMR (C$_7$D$_8$, 300 MHz): δ 1.12-1.91 (m 20 H), 3.27 (m, 10 H), 6.51 (s, 5 H) ppm. $^{13}$C NMR (C$_7$D$_8$, 75 MHz): δ 25.6, 26.5, 27.5, 32.6, 49.5, 58.0, 121.6 ppm.

Synthesis of CG12: Cp*[($^c$C$_6$H$_{10}$)$_2$NC(=N)NC$_5$H$_{10}$]TiCl$_2$ $^n$BuLi (3.2 mL, 5.1 mmol, 1.6 M in hexanes) was added to a solution of N,N-dicyclohexylpiperidylguanidine (1.54 g, 5.3 mmol) in THF (25 mL) at 0° C. The mixture was allowed to warm up to room temperature and stirred for another hour. This solution was then added to a solution of Cp*TiCl$_3$ (1.53 g, 5.3 mmol) in THF (16 mL) at −80° C. The mixture was allowed to warm up to room temperature and stirred for 1 day. The resulting suspension was evaporated to dryness and the residue was extracted with toluene. Subsequent filtration, in vacuo concentration and crystallization at low temperature from a toluene-hexane mixture afforded the desired compound as orange crystals. Yield: 0.58 g (20%). $^1$H NMR (C$_7$D$_8$, 300 MHz): δ 1.21-2.19 (m, 20 H), 2.24 (s, 15 H), 2.89 (m, 10 H), 3.05 (m, 2 H) ppm. $^{13}$C NMR (C$_7$D$_8$, 75 MHz): δ 13.3, 25.0, 25.9, 26.8, 32.1, 48.7, 57.3, 134.4 ppm.

Synthesis of N,N,N',N'-tetraphenylguanidine

A solution of diphenylamine (3.05 g, 18 mmol) and triethylamine (6 mL, 43 mmol) in THF (62 mL) was added dropwise to a stirred solution of triphosgene (1.99 g, 6.7 mmol) in THF (37 mL) at room temperature. The reaction mixture was heated to reflux overnight. Then, a solution of diphenylamine (3.1 g, 18 mmol) and triethylamine (5.8 mL, 42 mmol) in THF (37 mL) was added. The reaction mixture was stirred overnight at reflux temperature. The reaction mixture was filtered and the filtrate was evaporated to dryness, yielding tetraphenylurea as a yellow solid. Yield: 6.0 g (91%). Oxalyl chloride (1.8 mL, 21 mmol) was added to a stirred solution of the urea (6.0 g, 16 mmol) in diethyl ether (65 mL). The reaction mixture was evaporated to dryness after stirring for 2 days at reflux. A solution of ammonia in methanol (5 mL, 35 mmol, 7 M) was added. The reaction mixture was heated to reflux overnight and evaporated to dryness. The product was neutralized and purified from ammonium chloride by several treatments with aqueous sodium hydroxide solutions. The organic layer was extracted and dried over sodium sulfate. Crystallization from diethyl ether at low temperature yielded the desired guanidine as a white solid. Yield: 2.0 g (33%). $^{13}$C NMR (CDCl$_3$, 75 MHz): δ 121.4, 126.7, 128.6, 140.3, 164.5 ppm.

Synthesis of CG19: Cp[Ph$_2$NC(=N)NPh$_2$]TiCl$_2$ $^n$BuLi (1.7 mL, 2.6 mmol, 1.6 M in hexanes) was added to a solution of N,N,N',N'-tetraphenylguanidine (0.42 g, 2.5 mmol) in THF (25 mL) at 0° C. The mixture was allowed to warm up to room temperature and stirred for another hour. This solution was then added to a solution of CpTiCl$_3$ (0.56 g, 2.5 mmol) in THF (15 mL) at −80° C. The mixture was allowed to warm up to room temperature and stirred for 1 day. The resulting suspension was evaporated to dryness and the residue was extracted with hot toluene. Subsequent filtration, in vacuo concentration and crystallization at low temperature from a toluene-hexane mixture afforded the desired compound as orange crystals. Yield: 0.62 g (45%). $^1$H NMR (CD$_2$Cl$_2$, 300 MHz): δ 6.54 (s, 5 H), 6.80-7.40 (m, 20 H) ppm. $^{13}$C NMR (CD$_2$Cl$_2$, 75 MHz): δ 120.3, 126.5, 127.2, 128.4, 140.9, 161.5 ppm.

Synthesis of CG15: Cp*[Ph$_2$NC(=N)NPh$_2$]TiCl$_2$ $^n$BuLi (1.7 mL, 2.7 mmol, 1.6 M in hexanes) was added to a solution of N,N,N',N'-tetraphenylguanidine (0.98 g, 2.7 mmol) in THF (12 mL) at 0° C. The mixture was allowed to warm up to room temperature and stirred for another hour. This solution was then added to a solution of Cp*TiCl$_3$ (0.72 g, 2.5 mmol) in THF (15 mL) at −80° C. The mixture was allowed to warm up to room temperature and heated to reflux for 1 day. The resulting suspension was evaporated to dryness and the residue was extracted with hot toluene. Subsequent filtration, in vacuo concentration and crystallization at low temperature from a toluene-hexane mixture afforded the desired compound as dark red crystals. Yield: 0.65 g (42%). $^1$H NMR (CD$_2$Cl$_2$, 300 MHz): δ 6.54 (s, 5 H), 6.80-7.40 (m, 20 H) ppm. $^{13}$C NMR (CD$_2$Cl$_2$, 75 MHz): δ 13.3, 117.7, 126.5, 128.4, 129.3, 135.0 ppm.

Synthesis of N,N-diisopropyl-N'-methyl-N'-isobutylguanidine

A solution of diisopropylamine (2.6 mL, 19 mmol) and triethylamine (5.8 mL, 36 mmol) in THF (64 mL) was added dropwise to a stirred solution of triphosgene (1.99 g, 6.7 mmol) in THF (36 mL) at room temperature. The reaction mixture was heated to reflux overnight. Then, a solution of N-methylisobutylamine (2.2 mL, 18 mmol) and triethylamine (5.5 mL, 40 mmol) in THF (35 mL) was added. The reaction mixture was stirred overnight at reflux temperature. The reaction mixture was filtered and the filtrate was evaporated to dryness, yielding N-diisopropyl-N'-methyl-N'-isobutylurea as a yellow oil. Yield: 3.6 g (85%). Oxalyl chloride (1.5 mL, 17 mmol) was added to a stirred solution of the urea (3.6 g, 17 mmol) in diethyl ether (65 mL). The reaction mixture was evaporated to dryness after stirring at room temperature for 2 days. A solution of ammonia in methanol (6.4 mL, 45 mmol, 7 M) was added. The reaction mixture was heated to reflux overnight and evaporated to dryness. The product was neutralized and purified from ammonium chloride by several treatments with aqueous sodium hydroxide solutions. The organic layer was extracted and dried over sodium sulfate. Evaporation to dryness yielded the desired guanidine as a brown oil. Yield: 3.0 g (82%). $^1$H NMR (CDCl$_3$, 300 MHz): 0.80 (d, 6 H), 1.20 (d, 12 H), 1.8 (sept, 1H), 2.66 (s, 3 H), 2.83 (d, 2 H), 3.52 (sept, 1 H). $^{13}$C NMR (CDCl$_3$, 75 MHz): δ 19.1, 20.7, 25.6, 36.8, 46.4, 57.2, 164.7 ppm.

Synthesis of CG13: Cp[Me$^i$BuNC(=N)N$^i$Pr$_2$]TiCl$_2$ $^n$BuLi (2.4 mL, 3.8 mmol, 1.6 M in hexanes) was added to a solution of N,N-diisopropyl-N'-methyl-N'-isobutylguanidine (1.06 g, 5.0 mmol) in THF (37 mL) at 0° C. The mixture was allowed to warm up to room temperature and stirred for another day. This solution was then added to a solution of CpTiCl$_3$ (1.11 g, 5.1 mmol) in THF (15 mL) at −80° C. The mixture was allowed to warm up to room temperature and stirred for 1 day. The resulting suspension was evaporated to dryness and the residue was extracted with toluene. Subsequent filtration, in vacuo concentration and crystallization at low temperature from a toluene-hexane mixture afforded the desired compound as a dark brown solid. Yield: 0.76 g (39%). $^1$H NMR (CD$_2$Cl$_2$, 300 MHz): δ 0.84 (d, 6 H), 1.20 (d, 12 H), 1.83 (sept, 1 H), 2.65 (s, 3 H), 2.82 (d, 2 H), 3.56 (sept, 2 H), 6.62 (s, 5 H) ppm. $^{13}$C NMR (CD$_2$Cl$_2$, 75 MHz): δ 20.0, 21.6, 26.7, 37.7, 47.4, 58.2, 119.3 ppm.

Synthesis of CG17: Cp*[e$^i$BuNC(=N)N$^i$Pr$_2$]TiCl$_2$ $^n$BuLi (2.4 mL, 3.8 mmol, 1.6 M in hexanes) was added to a solution of N,N-diisopropyl-N'-methyl-N'-isobutylguanidine (1.06 g, 5.0 mmol) in THF (37 mL) at 0° C. The mixture was allowed to warm up to room temperature and stirred for another day. This solution was then added to a solution of CpTiCl$_3$ (1.11 g, 5.1 mmol) in THF (15 mL) at −80° C. The mixture was allowed to warm up to room temperature and stirred for 1 day. The resulting suspension was evaporated to dryness and the residue was extracted with toluene. Subsequent filtration, in vacuo concentration and crystallization at low temperature from a toluene-hexane mixture afforded the desired compound as a dark brown solid. Yield: 0.76 g (39%). $^1$H NMR (CD$_2$Cl$_2$, 300 MHz): δ 0.84 (d, 6 H), 1.24 (d, 12 H), 1.83 (sept, 1 H), 2.24 (s, 15 H), 2.36 (s, 3 H), 2.87 (m, 1 H) 3.58 (m, 1 H) ppm. $^{13}$C NMR (CD$_2$Cl$_2$, 75 MHz): δ 13.3, 14.4, 20.0, 26.7, 37.8, 58.3, 134.3, 166.4 ppm.

Synthesis of N,N,N',N'-tetracyclohexylguanidine

A solution of dicyclohexylamine (3.9 mL, 19 mmol) and triethylamine (6 mL, 43 mmol) in THF (64 mL) was added dropwise to a stirred solution of triphosgene (1.99 g, 6.7 mmol) in THF (35 mL) at room temperature. The reaction mixture was stirred overnight. Then, a solution of dicyclohexylamine (3.9 mL, 18 mmol) and triethylamine (6 mL, 43 mmol) in THF (37 mL) was added. The reaction mixture was stirred overnight at reflux temperature. The reaction mixture was filtered and the filtrate was evaporated to dryness, yielding tetracyclohexylurea as a yellow solid. Yield: 4.5 g (65%). A solution of oxalyl chloride in dichloromethane (1.1 mL, 13 mmol) was added to a stirred solution of the urea (4.5 g, 11 mmol) in THF (50 mL). The reaction mixture was evaporated to dryness after overnight heating to reflux. A solution of ammonia in methanol (5 mL, 35 mmol, 7 M) was added to a solution of the formed solid in THF (40 mL). The reaction mixture was heated to reflux overnight and evaporated to dryness. The product was neutralized and treated with aqueous sodium hydroxide solution. The organic layer was extracted with diethyl ether and dried over magnesium sulfate. Crystallization from hexanes yielded the desired guanidine as a brown solid. Yield: 2.9 g (64%). $^{13}$C NMR (CDCl$_3$, 75 MHz): δ 25.4, 26.2, 31.8, 58.0, 156.2 ppm.

Synthesis of CG18: Cp[Cy$_2$NC(=N)NCy$_2$]TiCl$_2$ $^n$BuLi (0.9 mL, 1.4 mmol, 1.6 M in hexanes) was added to a solution of N,N,N',N'-tetracyclohexylguanidine (0.59 g, 1.3 mmol) in THF (14 mL) at 0° C. The mixture was allowed to warm up to room temperature and stirred for 2 hours. This solution was then added to a solution of CpTiCl$_3$ (0.29 g, 1.3 mmol) in THF (10 mL) at −80° C. The mixture was allowed to warm up to room temperature and stirred for 4 days. The resulting suspension was evaporated to dryness and the residue was extracted with hot toluene. Subsequent filtration, in vacuo concentration and crystallization at low temperature from a toluene-hexane mixture afforded the desired compound as a brown solid. Yield: 0.41 g (56%). $^1$H NMR (CD$_2$Cl$_2$, 300 MHz): δ 1.24-1.75 (m, 40 H), 2.75 (m, 4 H), 6.54 (s, 5H) ppm. $^{13}$C NMR (CD$_2$Cl$_2$, 75 MHz): δ 25.4, 26.4, 32.0, 58.1, 120.3 ppm.

Synthesis of CG20: Cp*[Cy$_2$NC(=N)NCy$_2$]TiCl$_2$ $^n$BuLi (1.65 mL, 2.6 mmol, 1.6 M in hexanes) was added to a solution of N,N,N',N'-tetracyclo-hexylguanidine (1.01 g, 2.6 mmol) in THF (13 mL) at 0° C. The mixture was allowed to warm up to room temperature and stirred overnight. This solution was then added to a solution of Cp*TiCl$_3$ (0.75 g, 2.6 mmol) in THF (8 mL) at −80° C. The mixture was allowed to warm up to room temperature and heated to reflux overnight. The resulting suspension was evaporated to dryness and the residue was extracted with hot toluene. Subsequent filtration, in vacuo concentration and crystallization at low temperature from a toluene-hexane mixture afforded the desired compound as red crystals. Yield: 0.57 g (34%). $^1$H NMR (CD$_2$Cl$_2$, 300 MHz): δ 0.89-1.75 (m, 40H), 2.35 (s, 15 H), 2.77 (m, 4 H) ppm. $^{13}$C NMR (CD$_2$Cl$_2$, 75 MHz): δ 13.4, 25.4, 26.4, 32.0, 58.1, 138.7 ppm.

Synthesis of N-methyl-N-isobutyl-N',N'-dicyclohexyl-guanidine

A solution of dicyclohexylamine (3.6 mL, 18 mmol) and triethylamine (5.6 mL, 40 mmol) in THF (64 mL) was added dropwise to a stirred solution of triphosgene (1.98 g, 6.7 mmol) in THF (35 mL) at room temperature. The reaction mixture was stirred overnight. Then, a solution of N-methyl-isobutylamine (2.2 mL, 18 mmol) and triethylamine (5.5 mL, 40 mmol) in THF (35 mL) was added. The reaction mixture was stirred overnight at reflux temperature. The reaction mixture was filtered and the filtrate was evaporated to dryness, yielding N-methyl-N-isobutyl-N',N'-dicyclohexylurea as a dark yellow oil. Yield: 4.8 g (90%). Oxalyl chloride (8 mL, 16 mmol, 2 M solution in dichloromethane) was added to a stirred solution of the urea (4.8 g, 16 mmol) in THF (65 mL). The reaction mixture was heated to reflux overnight and evaporated to dryness. Ammonia in methanol (7 mL, 49 mmol, 7 M solution in methanol) was added to a suspension of the formed solid in THF. The reaction mixture was heated to reflux overnight and evaporated to dryness. The product was neutralized and purified by treatment with aqueous sodium hydroxide solution. The organic layer was extracted with diethyl ether and dried over magnesium sulfate. Evaporation to dryness yielded the desired guanidine as a brown oil. Yield: 2.95 g (75%). $^1$H NMR (CDCl$_3$, 300 MHz): δ 0.80 (d, 6 H), 1.20 (d, 12 H), 1.8 (sept, 1 H), 2.7 (s, 3 H), 2.83 (d, 2 H), 3.52 (sept, 1 H) ppm. $^{13}$C NMR (CDCl$_3$, 75 MHz): δ 19.1, 20.7, 25.6, 36.8, 46.4, 57.2, 164.7 ppm.

Synthesis of CG23: Cp[Me$^i$BuNC(=N)NCy$_2$]TiCl$_2$ $^n$BuLi (1.6 mL, 2.5 mmol, 1.6 M in hexanes) was added to a solution of N-methyl-N-isobutyl-N',N'-dicyclohexylguanidine (1.06 g, 5.0 mmol) in THF (13 mL) at 0° C. The mixture was allowed to warm up to room temperature and stirred for 4 hours. This solution was then added to a solution of CpTiCl$_3$ (0.54 g, 2.5 mmol) in THF (10 mL) at −80° C. The mixture was allowed to warm up to room temperature and stirred overnight. The resulting suspension was evaporated to dryness and the residue was extracted with hot toluene. Subsequent in vacuo concentration afforded the desired compound as a dark brown solid. Yield: 0.18 g (16%). $^1$H NMR (CD$_2$Cl$_2$, 300 MHz): δ 0.83 (d, 6 H), 1.21-1.77 (m, 20 H), 2.19 (m, 1 H), 2.66 (s, 3 H), 2.81 (d, 2 H), 3.07 (m, 2 H), 6.54-7.07 (m, 5 H) ppm. $^{13}$C NMR (CD$_2$Cl$_2$, 75 MHz): δ 19.2, 24.3, 25.9, 28.6, 31.3, 37.0, 56.5, 57.5, 119.5 ppm.

Synthesis of CG24: Cp*[(Me$^i$BuNC(=N)NCy$_2$]TiCl$_2$ $^n$BuLi (1.33 mL, 2.5 mmol, 1.6 M in hexanes) was added to a solution of N-methyl-N-isobutyl-N',N'-dicyclohexylguanidine (0.74 g, 2.5 mmol) in THF (12 mL) at 0° C. The mixture was allowed to warm up to room temperature and stirred overnight. This solution was then added to a solution of Cp*TiCl$_3$ (0.73 g, 2.5 mmol) in THF (10 mL) at −80° C. The mixture was allowed to warm up to room temperature and stirred for several days. The resulting suspension was evaporated to dryness and the residue was extracted with hot toluene. Subsequent filtration, in vacuo concentration and evaporation to dryness produced a dark powder. Yield: 0.52 g (38%). $^1$H NMR (CD$_2$Cl$_2$, 300 MHz): δ 0.83 (d, 6 H), 1.26-1.77 (m, 20 H), 2.24 (s, 15 H), 2.65 (s, 3 H), 2.83 (d, 2 H) ppm. $^{13}$C NMR (CD$_2$Cl$_2$, 75 MHz): δ 13.3, 20.0, 25.9, 27.8, 32.2, 37.8, 57.3, 58.3, 134.3 ppm.

Synthesis of N,N'-diisobutyl-N,N-dimethylguanidine

A solution of N-methylisobutylamine (2.2 mL, 18 mmol) and triethylamine (5.5 mL, 39 mmol) in THF (60 mL) was added dropwise to a stirred solution of triphosgene (1.98 g, 6.7 mmol) in THF (37 mL) at room temperature. The reaction mixture was stirred overnight. Then, a solution of N-methyl-isobutylamine (2.2 mL, 18 mmol) and triethylamine (5.5 mL, 40 mmol) in THF (35 mL) was added. The reaction mixture was stirred overnight at reflux temperature. The reaction mixture was filtered and the filtrate was evaporated to dryness, yielding N-methyl-N-isobutyl-N',N'-dicyclohexylurea as an orange oil. Yield: 3.3 g (92%). Oxalyl chloride (1.45 mL, 17 mmol) was added to a stirred solution of the urea (3.3 g, 16 mmol) in THF (70 mL). The reaction mixture was heated to reflux overnight and evaporated to dryness. Ammonia in methanol (7 mL, 49 mmol, 7 M solution in methanol) was added to a suspension of the formed solid in THF. The reaction mixture was heated to reflux overnight and evaporated to dryness. The product was neutralized and purified by treatment with aqueous sodium hydroxide solution. The organic layer was extracted with diethyl ether and dried over magnesium sulfate. Evaporation to dryness yielded the desired guanidine as a brown oil. Yield: 2.78 g (82%). $^1$H NMR (CDCl$_3$, 300 MHz): δ 0.74 (d, 12 H), 1.76 (sept, 2 H), 2.66 (s, 6 H), 2.85 (d, 4H) ppm. $^{13}$C NMR (CDCl$_3$, 75 MHz): δ 19.8, 26.3, 37.1, 57.6, 165.6 ppm.

Synthesis of CG21: Cp*[(Me$^i$BuNC(=N)NMe$^i$Bu]TiCl$_2$ $^n$BuLi (1.6 mL, 2.5 mmol, 1.6 M in hexanes) was added to a solution of N,N'-diisobutyl-N,N-dimethylguanidine (0.51 g, 2.5 mmol) in THF (13 mL) at 0° C. The mixture was allowed to warm up to room temperature and stirred for 4 hours. This solution was then added to a solution of Cp*TiCl$_3$ (0.72 g, 2.5 mmol) in THF (8 mL) at −80° C. The mixture was allowed to warm up to room temperature and stirred overnight. The resulting suspension was evaporated to dryness and the residue was extracted with hot toluene. Subsequent in vacuo concentration afforded the desired compound as an orange powder. Yield: 0.40 g (35%). $^1$H NMR (CD$_2$Cl$_2$, 300 MHz): δ 0.84 (d, 12 H) 1.86 (m, 2 H), 2.24 (s, 15 H), 2.75 (s, 6 H), 2.93 (d, 4 H) ppm. $^{13}$C NMR (CD$_2$Cl$_2$, 75 MHz): δ 13.3, 19.9, 26.7, 37.3, 57.9, 134.3 ppm.

Synthesis of CG21M: Cp*[Me$^t$BuNC(=N)NMe$^t$Bu]TiMe$_2$

Methylmagnesium bromide (0.9 mL, 2.6 mmol, 3 M solution in diethyl ether) was added to a solution of CG21M (0.6 g, 1.3 mmol) in toluene (7.5 mL) at −78° C. The mixture was stirred, allowed to warm up to room temperature and stirred overnight. Evaporation to dryness yielded and oil which was extracted with hexane. A yellow powder was obtained after evaporation to dryness. Yield: 0.37 g (69%). $^1$H NMR (CD$_2$Cl$_2$, 300 MHz): δ 0.39 (s, 6 H), 0.92 (d, 11 H), 2.09 (s, 15 H), 2.25 (s, 6 H), 2.47 (d, 4 H) ppm.

Copolymerization of Ethylene and 1-octene

Examples 1 and 2

The preparation of the catalyst systems as well as the copolymerization reactions were performed according to above detailed parallel polymerization equipment procedure by in situ reaction of solutions of ligands m12 and m14 with solutions of metal compounds c4 in the presence of activator and scavenger as described. The polymerization results are given in Table 1.

The polymerization results are given in Table 1. It can be seen that catalyst systems comprising a catalyst component comprising guanidine ligands m12 and m14 (Table 1, Examples 1 and 2) have better productivity and yield higher molecular weight copolymers than the catalyst system where the guanidinate ligand is not present.

Comparative Experiment B and C

Catalyst systems formed from metal compound c13 were evaluated according to the polymerization procedure and conditions of Example 1 and 2 respectively. The polymerization results are given in Table 1

Comparative Experiments B and C

The formed catalyst systems are inefficient ethylene/1-octene copolymerization catalysts, as known from the prior art and are not part of the present invention.

Copolymerization of Ethylene and Propylene

EXAMPLES

The copolymerization reactions were performed according to above described batch procedure using the above described

TABLE 1

Results of ethylene/1-octene copolymerization experiments

| Example Nr. | Ligand | Catalyst Component | catalyst loading (nmol) | Time (s) | Yield (mg) | Mw (kg/mol) | Mw/Mn | 1-octene (mol %) | Productivity (ppm Ti) |
|---|---|---|---|---|---|---|---|---|---|
| 1 | m12 | c4 | 1.5 | 602 | 38 | 2456 | 2.1 | 6.7 | 1.92 |
| 2 | m14 | c4 | 1.2 | 600 | 40 | 1545 | 2.4 | 4.8 | 1.44 |
| Comp. A | 0 | c4 | 10 | 623 | 103 | 323 | 2.5 | 4.5 | 4.65 |
| Comp. B | m12 | c13 | 3 | 601 | 2 | n.d. | n.d. | n.d. | 59.85 |
| Comp. C | m14 | c13 | 3 | 600 | 3 | n.d. | n.d. | n.d. | 47.88 | n.d. = not determined

The catalysts systems formed from guanidine ligands m12 and m14 with metal compound c4, bearing a pentamethylcyclopentadienyl ligand afforded efficient ethylene/1-octene copolymerization catalysts according to the present invention.

Comparative Experiment A

A catalyst system formed from metal compound c4 was evaluated according to the polymerization procedure and conditions of Example 1 in the absence of a guanidine ligand.

catalyst components are reported as examples 3, 7, 8, 9, 10 and 11. The polymerization results are given in Table 2.

Comparative Experiment

Identical experiments to examples 3, 7, 8, 9, 10 and 11 have been performed (D, G, H, I, J, K respectively) with the only difference that the employed catalyst component had an unsubstituted Cp ligand. The lower activities had to be compensated by increased dosage of catalyst component. The polymerization results are given in Table 2.

TABLE 2

Results of ethylene propylene copolymerization experiments

| Example nr. | Catalyst component | Catalyst | Al/Ti (molar) | TBF20/Ti (molar) | C3/C2 (molar) | Yield (g) | Prod. (ppm Ti.) | C2 (wt %) | IV (dL/g) |
|---|---|---|---|---|---|---|---|---|---|
| 3 | CG05 | | 0.40 | 1125 | 2 | 80/40 | 12.81 | 1.50 | 50.1 | 10.1 |
| 4 | CG05M | | 0.20 | 2250 | 2 | 80/40 | 12.82 | 0.75 | n.d | n.d |
| Comp. D | CG02 | | 0.40 | 1125 | 2 | 80/40 | 0.76 | 25.20 | n.d. | n.d |
| 5 | CG21 | | 0.50 | 1000 | 2 | 50/50 | 13.42 | 1.78 | 52.1 | 1.2 |
| 6 | CG21M | | 0.07 | 7143 | 2 | 50/50 | 10.28 | 0.33 | n.d | n.d |
| Comp. E | Cl01 | | 0.20 | 2250 | 0 | 80/40 | 15.06 | 0.64 | n.d | n.d |
| Comp. F | Cl07 | | 0.20 | 2250 | 0 | 80/40 | 14.73 | 0.65 | n.d | n.d |
| 7 | CG12 | | 0.10 | 5000 | 2 | 80/20 | 2.11 | 2.27 | 48.7 | 4.78 |
| Comp. G | CG11 | | 2.00 | 1000 | 1 | 80/40 | 1.53 | 62.59 | n.d | n.d |

TABLE 2-continued

Results of ethylene propylene copolymerization experiments

| Example nr. | Catalyst component | Catalyst | Al/Ti (molar) | TBF20/Ti (molar) | C3/C2 (molar) | Yield (g) | Prod. (ppm Ti.) | C2 (wt %) | IV (dL/g) |
|---|---|---|---|---|---|---|---|---|---|
| 8 | CG15 | | 0.30 | 1667 | 2 | 50/50 | 4.32 | 3.33 | 51.8 | 1.42 |
| Comp. H | CG19 | | 2.00 | 1000 | 2 | 50/50 | 2.87 | 33.37 | n.d | n.d |
| 9 | CG17 | | 0.30 | 1000 | 2 | 50/50 | 4.15 | 3.46 | n.d | 1.37 |
| Comp. I | CG13 | | 2.00 | 1000 | 1 | 80/40 | 1.35 | 70.93 | n.d | n.d |
| 10 | CG20 | | 0.50 | 1000 | 2 | 50/50 | 11.89 | 2.01 | n.d | 1.12 |
| Comp. J | CG18 | | 2.00 | 1000 | 2 | 50/50 | 2.06 | 46.49 | n.d | n.d |
| 11 | CG24 | | 0.50 | 1000 | 2 | 50/50 | 15.09 | 1.59 | 50.6 | 1.17 |
| Comp. K | CG23 | | 2.00 | 1000 | 2 | 50/50 | 8.42 | 11.37 | n.d | 3.15 | n.d. = not determined

The polymerization results given in Table 2 show that an efficient catalyst system for ethylene propylene copolymerization is obtained, when the cyclopentadienyl guanidinate titanium catalyst component comprises a pentamethylcyclopentadienyl ligand (Examples 3, 7, 8, 9, 10 and 11) according to the invention. The catalyst system comprising the catalyst component with the unsubstituted cyclopentadienyl ligand (Comparative Experiments D, G, H, I, J and K) result in poor polymerization results, as known from the above cited prior art.

Comparative Experiments E and F

Ethylene propylene copolymerization experiments employing the iminoimidazolidine bearing catalyst components CI1 and CI7 were conducted according to the batch method. The polymerization results are given in Table 2.

It can be seen that the formed iminoimidazolidine based catalyst systems are efficient ethylene/propylene copolymerization catalysts, as known from prior art. The introduction of substituted cyclopentadienyl derivative (CI7, comparative Experiment F) has a negative impact on the productivity if compared to the unsubstituted cyclopentadienyl derivative (CI1, comparative Experiment E). This behavior from the prior art stands in strong contrast to the present invention, where the introduction of a substituted cyclopentadienyl ligand in the catalyst component results in improved productivity of the catalyst system as described above.

Examples 4 and 6

Ethylene propylene copolymerization experiments employing dimethyl versions of the pentamethylcyclopentadienyl guanidinate titanium catalyst component have been performed in example 4 and 6. The use of the catalyst components CG5M and CG21M show a further improvement of polymerization activity if compared to the respective dichloro catalyst components from examples 3 and 5 respectively.

Copolymerization of Ethylene, Propylene, ENB and VNB

Example 12

The copolymerization was conducted in a batch polymerization reactor according to Example 3 (catalyst component CG5) with the following changes: solvent (PMH) contained ENB (0.7 mL) and VNB (0.7 mL), triphenyl-methylium tetrakis(pentafluorophenyl) borate (boron:catalyst molar ratio=2) was added directly after the catalyst injection into the pressurized reactor, and the C3/C2 molar feed ratio was 2. The polymerization results are given in Table 3.

TABLE 3

Results of ethylene/propylene/VNB/ENB experiments.

| Example Nr. | Catalyst Component | Catalyst Loading (μmol) | Yield (g) | C2 (wt %) | ENB (wt %) | VNB (wt %) | Productivity (ppm Ti) |
|---|---|---|---|---|---|---|---|
| 12 | CG5 | 0.40 | 5.91 | 47.8 | 1.42 | 0.96 | 3.24 |
| Comp. L | c1 | 0.10 | 12.57 | 48.4 | 1.08 | 0.75 | 0.38 |

Comparative Experiment L

An identical experiment to Example 4 was performed with the only difference that c1 was employed as catalyst component. The polymerization results are given in Table 3.

In the comparison of the results given in Table 3 (Example 12 and Comparative Experiment L), the catalyst system according to the present invention (CG5) shows an increased affinity for incorporation of ENB and VNB than the reference catalyst c1 (Comparative Example L). This represents a further advantage of the present invention allowing more efficient production processes for ethylene-propylene diene terpolymers with increased levels of copolymerized dienes such as ENB and VNB.

The invention claimed is:

1. A catalyst component for the polymerization of olefins, the catalyst component being of formula $CyLMZ_p$, wherein
   M is a Group 4-6 metal,
   Cy is a cyclic ligand,
   L is a guanidinate ligand,
   Z is an anionic ligand, and
   p is the number of anionic ligands
which component is characterized in that Cy is a pentasubstituted cyclopentadienyl-type ligand, and L is a guanidinate ligand of the formula

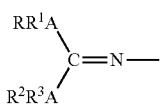

wherein:
- each A is independently selected from nitrogen or phosphorus, and
- R, R$^1$, R$^2$ and R$^3$ are independently selected from the group consisting of hydrogen, hydrocarbyl, silyl and germyl residues, substituted or not with one or more halogen, amido, phosphido, alkoxy, or aryloxy radicals.

2. Catalyst component according to claim 1, wherein M is selected from the group consisting of Ti, Zr and Hf.

3. Catalyst component according to claim 1 or 2, wherein the pentasubstituted cyclopentadienyl-type ligand Cy is substituted at each of the five substituent positions with a same or different radical selected from the group consisting of halogen, hydrocarbyl, silyl and germyl residues, optionally substituted with one or more halogen, amido, phosphide, alkoxy, or aryloxy radicals.

4. Catalyst component according to claim 1, wherein A is nitrogen and R, R$^1$, R$^2$ and R$^3$ are independently selected from the group consisting of hydrogen and hydrocarbyl residue.

5. Catalyst component according to claim 1, wherein the anionic ligand Z is selected from the group consisting of C$_{1-10}$ hydrocarbyl radicals.

6. A catalyst system for the polymerization of olefins comprising a catalyst component in the presence of one or more ingredients selected from the group consisting of activator, scavenger and carrier characterized in that the catalyst component is according to claim 1.

7. Catalyst system according to claims 6, wherein the activator is selected from the group consisting of borate, borane and alkylaluminoxane.

8. A process for the polymerization of one or more olefins having 2 to 20 carbon atoms characterized in that the one or more olefins are contacted with the catalyst component according to claim 1 in the presence of an activator.

9. Process according to claim 8, wherein the olefin is ethylene.

10. Process according to claim 8, wherein the olefins are ethylene and 1-octene.

11. Process according to claim 8, wherein the olefins are ethylene and propylene, 12. Process according to claim 8, wherein the olefins are ethylene, propylene and at least one non-conjugated diene.

13. Catalyst component according to claim 3, wherein the pentasubstituted cyclopentadienyl-type ligand Cy is substituted at each of the five substituent positions with a same radical selected from the group consisting of halogen, hydrocarbyl, silyl and germyl residues, optionally substituted with one or more halogen, amido, phosphido, alkoxy, or aryloxy radicals.

14. Catalyst component according to claim 1 or 2, wherein the pentasubstituted cyclopentadienyl-type ligand Cy is a pentamethylcyclopentadienyl ligand.

15. Catalyst component according to claim 13, wherein M is Ti.

16. Catalyst component according to claim 15, wherein:
- A is nitrogen,
- R, R$^1$, R$^2$ and R$^3$ are independently selected from the group consisting of hydrogen and hydrocarbyl residue, and
- Z is selected from the group consisting of halogen and C$_{1-10}$ hydrocarbyl radicals.

17. Catalyst component according to claim 16, wherein:
- R, R$^1$, R$^2$ and R$^3$ are independently selected from the group consisting of hydrogen, methyl, ethyl, propyl, butyl, benzyl, and
- Z is selected from chlorine and methyl.

* * * * *